(12) United States Patent
Komiyama et al.

(10) Patent No.: US 7,757,660 B2
(45) Date of Patent: Jul. 20, 2010

(54) INTAKE DEVICE FOR INTERNAL COMBUSTION ENGINE

(75) Inventors: Tadashi Komiyama, Chiryu (JP); Naoki Osumi, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/149,490

(22) Filed: May 2, 2008

(65) Prior Publication Data

US 2008/0283016 A1 Nov. 20, 2008

(30) Foreign Application Priority Data

May 18, 2007 (JP) .............................. 2007-133343

(51) Int. Cl.
*F02D 9/08* (2006.01)
(52) U.S. Cl. ..................... 123/337; 123/442; 123/336
(58) Field of Classification Search ............. 123/190.2, 123/306, 336, 337, 442; 137/625.29, 625.3, 137/625.31
See application file for complete search history.

(56) References Cited

U.S. PATENT DOCUMENTS

| | | | | |
|---|---|---|---|---|
| 5,511,584 A | * | 4/1996 | Leinen | ..................... 137/625.3 |
| 5,749,335 A | * | 5/1998 | Flanery et al. | ............... 123/337 |
| 6,131,554 A | * | 10/2000 | Ito et al. | ................. 123/568.14 |
| 6,585,235 B2 | * | 7/2003 | Pattullo | ....................... 261/44.8 |
| 2004/0237931 A1 | | 12/2004 | Okamoto et al. | |

FOREIGN PATENT DOCUMENTS

| | | |
|---|---|---|
| JP | 2005-054603 | 3/2005 |
| JP | 2005-105968 | 4/2005 |

\* cited by examiner

*Primary Examiner*—Stephen K Cronin
*Assistant Examiner*—Anthony L Bacon
(74) *Attorney, Agent, or Firm*—Nixon & Vanderhye PC

(57) ABSTRACT

A cross-sectional shape of a first intake passage is formed in a circular shape and a cross-sectional shape of a second intake passage is formed in a rectangular shape. Thus, an opening area of a second intake throttle portion can be made larger than an opening area of a first intake throttle portion even when the opening area of the first intake throttle portion is narrow and an intake air quantity supplied into a combustion chamber of an engine is small as in the case of engine start-up or engine idling operation. Accordingly, an intended strong tumble flow in accordance with a demand for improving a combustion efficiency in the combustion chamber can be generated in the combustion chamber while achieving the intake air quantity necessary during the engine start-up or the engine idling operation.

12 Claims, 12 Drawing Sheets

FIG. 4A
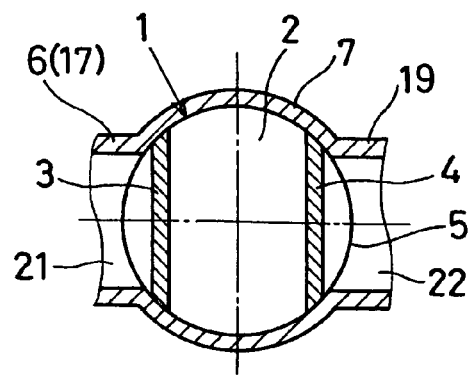
FIG. 4B   FIG. 4C   FIG. 4D
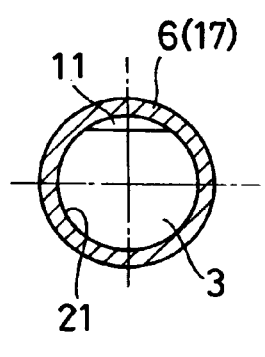 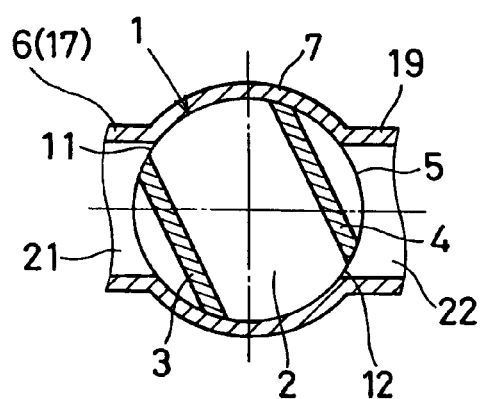 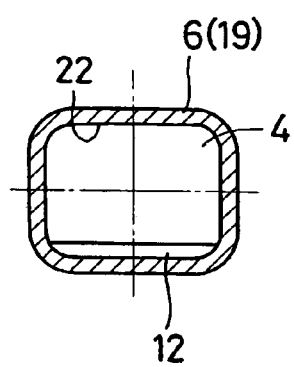

FIG. 6A
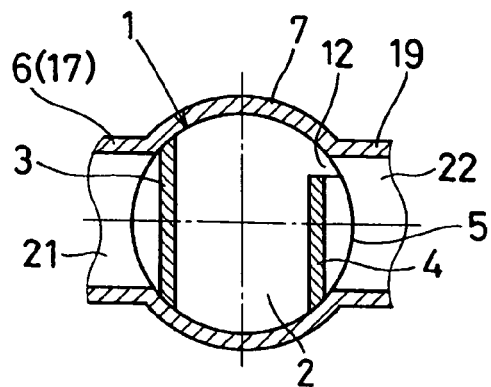
FIG. 6B  FIG. 6C  FIG. 6D
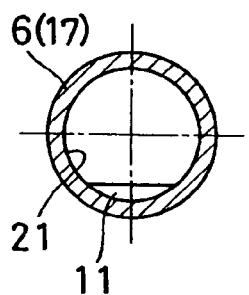 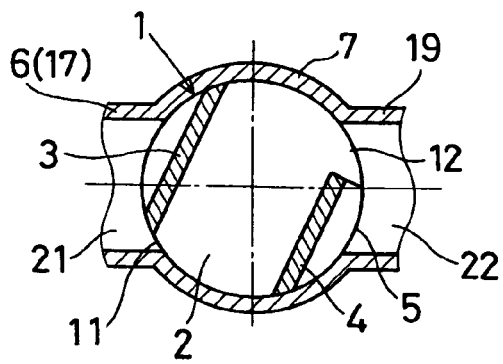 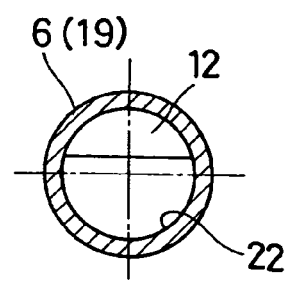
FIG. 6E
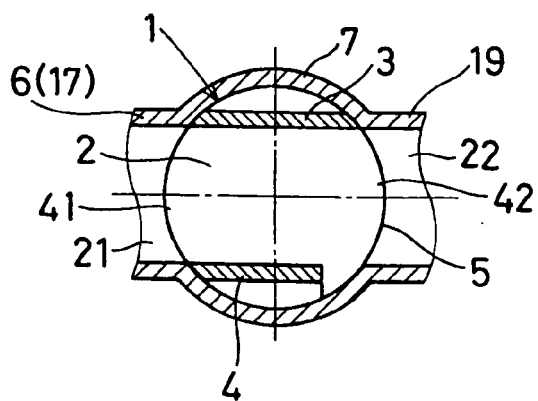

FIG. 10A
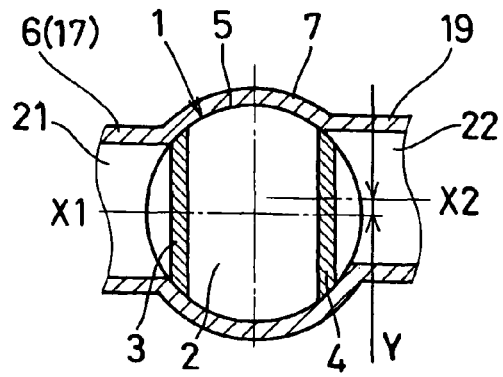
FIG. 10B  FIG. 10C  FIG. 10D
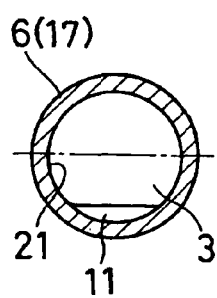 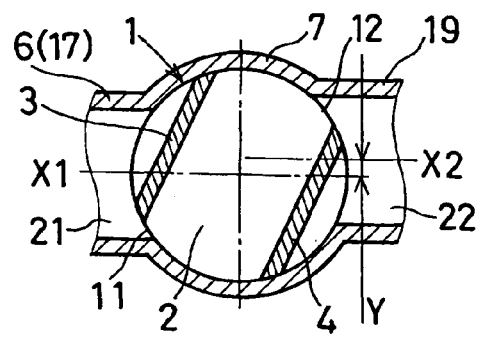 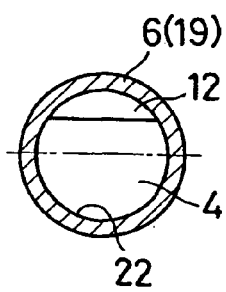
FIG. 10E
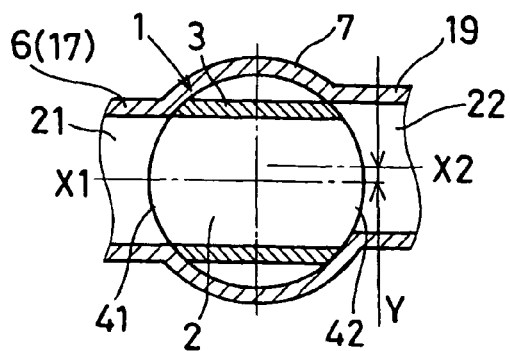

FIG. 11A
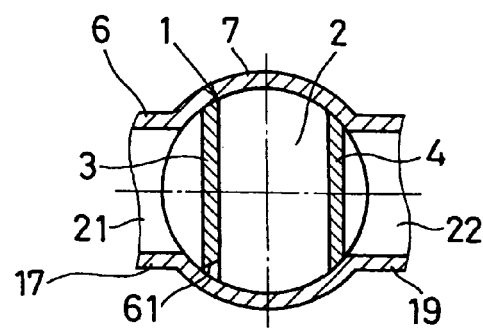
FIG. 11B    FIG. 11C    FIG. 11D
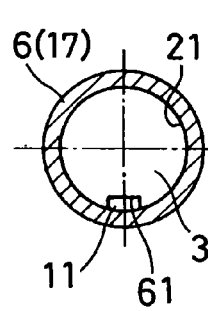 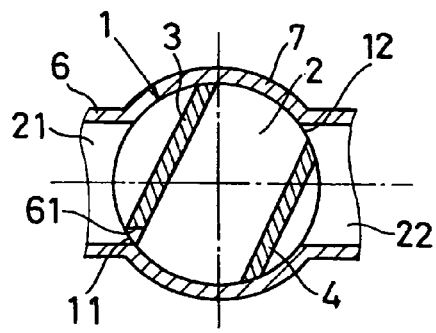 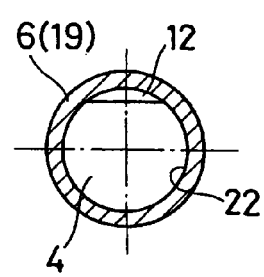
FIG. 11F    FIG. 11E
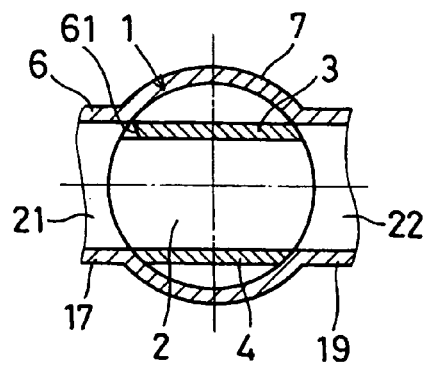 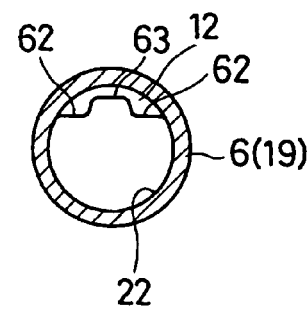

INTAKE DEVICE FOR INTERNAL COMBUSTION ENGINE

CROSS REFERENCE TO RELATED APPLICATION

This application is based on and incorporates herein by reference Japanese Patent Application No. 2007-133343 filed on May 18, 2007.

BACKGROUND OF THE INVENTION

1. Field of the Invention

The present invention relates to an intake device for an internal combustion engine for supplying intake air into a combustion chamber of the internal combustion engine. In particular, the present invention relates to an intake device of an internal combustion engine having a rotary tumble control valve generating a tumble flow in a combustion chamber of the internal combustion engine.

2. Description of Related Art

As shown in FIGS. 12A to 12E, there is conventionally a known intake device for an internal combustion engine having a rotary tumble control valve (or rotary throttle valve) generating a tumble flow in a combustion chamber of the internal combustion engine (for example, refer to Patent document 1: JP-A-2005-054603 or Patent document 2: JP-A-2005-105968). The rotary tumble control valve (or the rotary throttle valve) has a rotary valve 101 (a valve member) rotating around its rotational axis line, a duct 102 for rotatably accommodating the rotary valve 101 and an actuator installed to an outside of the duct 102 for driving a rotary shaft of the rotary valve 101.

The rotary valve 101 has a first valve main body 103 located upstream of the rotational axis line of the rotary valve 101 with respect to a flow direction of intake air (i.e., an intake flow direction) and a second valve main body 104 located downstream of the rotational axis line of the rotary valve 101 with respect to the intake flow direction. A link-up passage 105 (a hollow portion) for providing communication between a first intake passage 111 and a second intake passage 112 is provided between the first and second valve main bodies 103, 104.

When a fully-closed opening degree state where the rotary valve 101 is fully closed is defined as a fully closed position (refer to FIG. 12A) and a fully-open opening degree state where the rotary valve 101 is fully open is defined as a fully open position (refer to FIG. 12E), the first and second valve main bodies 103, 104 are structured such that the rotary valve 101 is held at a state of a small opening degree (refer to FIG. 12C) where the rotary valve 101 is slightly opened in a valve-opening operation direction from the fully closed position, i.e., where the rotary valve 101 is half open, during an idling operation of the internal combustion engine.

During the idling operation of the internal combustion engine, a first throttle portion 121 is formed between a cylindrical portion of the duct 102 and a lower end portion (in the figure) of the first valve main body 103 and a second throttle portion 122 is formed between the cylindrical portion of the duct 102 and an upper end portion (in the figure) of the second valve main body 104. The first and second throttle portions 121, 122 constitute portions for throttling passage areas of the first intake passage 111 and the second intake passage 112. The first and second throttle portions 121, 122 have equal opening areas in a low rotation speed region or a low load region of the internal combustion engine. In some cases, the opening area of the second throttle portion 122 is set smaller than the opening area of the first throttle portion 121.

However, in the intake device for the internal combustion engine described in Patent document 1 or 2, when the opening degree of the first throttle portion 121 is set at the small opening degree in order to achieve an intake air quantity necessary for performing the idling operation of the internal combustion engine requiring the tumble flow in the combustion chamber of the internal combustion engine, the opening area of the second throttle portion 122 becomes small since the first valve main body 103 and the second valve main body 104 are mechanically connected with each other. Accordingly, the small opening area of the second throttle portion 122 during the idling operation of the internal combustion engine makes it difficult to generate a strong tumble flow in the combustion chamber of the internal combustion engine.

That is, the intake flow becomes thin rapidly or the passage areas of the first and second intake passages 111, 112 become small rapidly due to the small opening area of the second throttle portion 122, thus causing a thin intake flow along a ceiling wall surface of an intake port of the internal combustion engine. In consequence, the intake flow is strongly influenced by a shape of the intake port of the internal combustion engine, making it difficult to generate an intended tumble flow according to a demand for improving a combustion efficiency in the combustion chamber of the internal combustion engine to improve fuel consumption or the like.

SUMMARY OF THE INVENTION

It is an object of the present invention to provide an intake device of an internal combustion engine capable of making an opening area of a second throttle portion larger than an opening area of a first throttle portion when rotation speed or a load of the internal combustion engine is equal to or lower than a threshold value. It is another object of the present invention to provide an intake device of an internal combustion engine capable of producing intended intake fluidity according to a demand for improving a combustion efficiency in a combustion chamber of the internal combustion engine while achieving an intake air quantity necessary for an operation of the internal combustion engine when rotation speed or a load of the internal combustion engine is equal to or lower than a threshold value.

According to an aspect of the present invention, a first throttle portion (a gap) is formed between a duct and a first valve main body. In addition, a second throttle portion (a gap) is formed between the duct and a second valve main body. Alternatively, the second throttle portion (a through bore) may be formed in the second valve main body. An opening area of the second throttle portion is set to be larger than an opening area of the first throttle portion when rotation speed or a load of an internal combustion engine is equal to or less than a threshold value.

In consequence, the opening area of the second throttle portion can be made larger than the opening area of the first throttle portion even when the opening area of the first throttle portion is narrow and an intake air quantity supplied into a combustion chamber of the internal combustion engine is small as in the case where the rotation speed or the load of the internal combustion engine is equal to or less than the threshold value.

According to another aspect of the present invention, the threshold value is an upper limit value of the rotation speed or the load of the internal combustion engine for obtaining an effect of improvement of a fuel consumption and an effect of early activation of a catalyst through generation of an intake vortex flow (a tumble flow or a swirl flow) in the combustion chamber of the internal combustion engine.

According to another aspect of the present invention, the first valve main body and the second valve main body are located in series in an intake passage. In consequence, when the rotation speed or the load of the internal combustion engine is equal to or less than the threshold value, an intake air flow flowing inside the duct (or the intake passage) passes through the first throttle portion and the second throttle portion and is introduced into the combustion chamber of the internal combustion engine.

According to another aspect of the present invention, the first valve main body or the first throttle portion has a function to vary an intake air quantity supplied into the combustion chamber of the internal combustion engine. The second valve main body or the second throttle portion has a function to generate an intake fluidity or an intake vortex flow in the combustion chamber of the internal combustion engine. In this case, the opening area of the second throttle portion is made larger than the opening area of the first throttle portion when the rotation speed or the load of the internal combustion engine is equal to or less than the threshold value. Thus, the intended intake fluidity or the intake vortex flow in accordance with a demand for contributing to an improvement of the combustion efficiency in the combustion chamber of the internal combustion engine can be produced while achieving the intake air quantity necessary for an operation of the internal combustion engine even when the opening area of the first throttle portion is narrow and the intake air quantity supplied into the combustion chamber of the internal combustion engine is small as in the case where the rotation speed or the load of the internal combustion engine is equal to or less than the threshold value.

According to another aspect of the present invention, the rotation speed or the load of the internal combustion engine becomes equal to or less than the threshold value when the internal combustion engine is started, when idling operation of the internal combustion engine is performed, or when the internal combustion engine is operated at low speed and a low load.

According to another aspect of the present invention, the first valve main body and the second valve main body are held at a state of an intermediate opening degree where the first valve main body and the second valve main body are opened in a valve-opening operation direction (i.e., a normal rotation direction) from a fully closed position when the rotation speed or the load of the internal combustion engine is equal to or less than the threshold value.

According to another aspect of the present invention, the first valve main body and the second valve main body are held at a state of an intermediate opening degree where the first valve main body and the second valve main body are opened in a valve-closing operation direction (i.e., a reverse rotation direction with respect to the valve-opening operation direction) from the fully closed position when the rotation speed or the load of the internal combustion engine is equal to or less than the threshold value.

According to another aspect of the present invention, a passage cross-sectional area of a second intake passage is set larger that that of a first intake passage. That is, passage shapes are differentiated between the first intake passage and the second intake passage, thus making it possible to make the opening area of the second throttle portion larger than that of the first throttle portion.

According to another aspect of the present invention, plate length of the second valve main body is set smaller than that of the first valve main body. That is, by differentiating the shapes of the first valve main body and the second valve main body, the opening area of the second throttle portion can be made larger than that of the first throttle portion.

According to another aspect of the present invention, the second valve main body has a formation position of a central portion closer to an outer peripheral portion of the housing than a formation position of a central portion of the first valve main body is. That is, by differentiating the formation positions of the first valve main body and the second valve main body in relation to the outer peripheral portion of the housing, the opening area of the second throttle portion can be made larger than that of the first throttle portion.

According to another aspect of the present invention, the second valve main body has a larger inclination angle with respect to a vertical line of a rotational axis line of the second valve main body than an inclination angle of the first valve main body with respect to a vertical line of a rotational axis line of the first valve main body. That is, by differentiating the inclination angles of the first valve main body and the second valve main body, the opening area of the second throttle portion can be made larger than that of the first throttle portion.

According to another aspect of the present invention, the rotational axis line of the first valve main body and the rotational axis line of the second valve main body are offset to the second throttle portion side from a central axis line of the intake passage. Thus, the opening area of the second throttle portion can be made larger than that of the first throttle portion.

According to another aspect of the present invention, the second intake passage has a central axis line offset to the second throttle portion side from a central axis line of the first intake passage. Thus, the opening area of the second throttle portion can be made larger than that of the first throttle portion.

According to another aspect of the present invention, the opening area of the second throttle portion is set larger than the opening area of the first throttle portion by forming a notch in the duct, the first valve main body or the second valve main body.

According to another aspect of the present invention, a single actuator collectively varies rotational angles of the first valve main body and the second valve main body. Thus, the number of components can be reduced. Accordingly, body size and weight of the valve unit constructed of the duct, the first and second valve main bodies, the actuator and the like can be reduced. In consequence, mountability of the valve unit can be improved, thereby easily ensuring a mounting space.

The rotational axis lines of the first valve main body and the second valve main body may be arranged in a direction perpendicular to the direction of the axis line of the intake passage. The rotational axis line (rotation axis) of the first valve main body and the rotational axis line (rotation axis) of the second valve main body may be arranged on the same axis line.

According to yet another aspect of the present invention, the first valve main body and the second valve main body are mechanically connected with each other. The first valve main body and the second valve main body may be integrally connected (united) to constitute the rotary valve. In this case, only a single rotary shaft of the rotary valve is used, so the rotational axis line of the first valve main body and the rotational axis line of the second valve main body are arranged on the same axis line.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

FIG. 4A is a cross-sectional view showing a fully-closed opening degree state of a rotary valve according to a second embodiment of the present invention;

FIGS. 4B to 4D are cross-sectional views each showing a small opening degree state of the rotary valve according to the second embodiment;

FIG. 6A is a cross-sectional view showing a fully-closed opening degree state of a rotary valve according to a fourth embodiment of the present invention;

FIGS. 6B to 6D are cross-sectional views each showing a small opening degree state of the rotary valve according to the fourth embodiment;

FIG. 6E is a cross-sectional view showing a fully-open opening degree state of the rotary valve according to the fourth embodiment;

FIG. 10A is a cross-sectional view showing a fully-closed opening degree state of a rotary valve according to an eighth embodiment of the present invention;

FIGS. 10B to 10D are cross-sectional views each showing a small opening degree state of the rotary valve according to the eighth embodiment;

FIG. 10E is a cross-sectional view showing a fully-open opening degree state of the rotary valve according to the eighth embodiment;

FIG. 11A is a cross-sectional view showing a fully-closed opening degree state of a rotary valve according to a ninth embodiment of the present invention;

FIGS. 11B to 11E are cross-sectional views each showing a small opening degree state of the rotary valve according to the ninth embodiment;

FIG. 11F is a cross-sectional view showing a fully-open opening degree state of the rotary valve according to the ninth embodiment;

DETAILED DESCRIPTION OF EXAMPLE EMBODIMENTS

Hereinafter, embodiments of the present invention will be explained with reference to the drawings.

Figure 1:
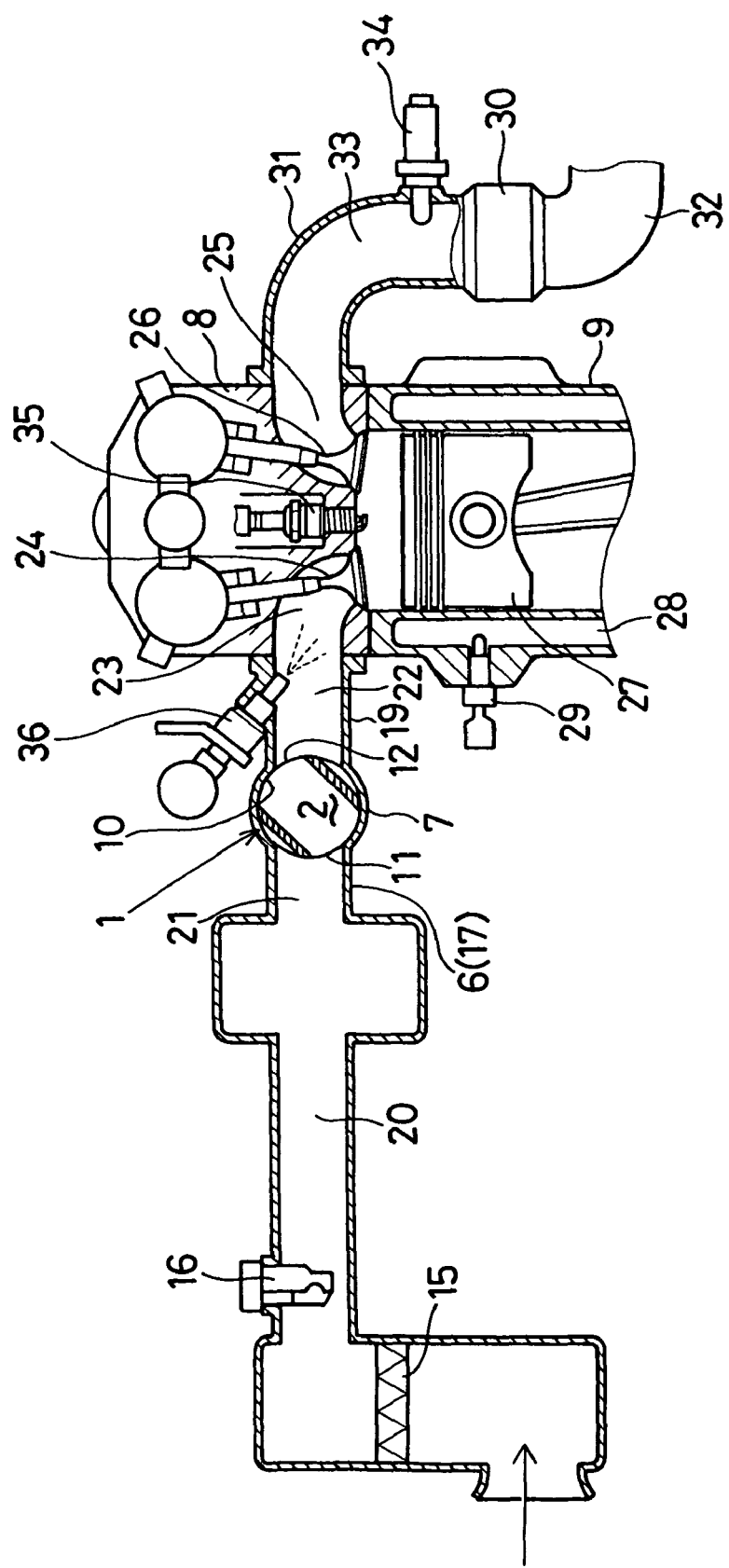
FIG. 1 is a schematic diagram showing an intake control device for an internal combustion engine according to a first embodiment of the present invention.

FIGS. 1 to 3E show a first embodiment of the present invention. FIG. 1 is a diagram showing an intake control device for an internal combustion engine. A control device (an engine control system) for an internal combustion engine according to the present embodiment is used as an intake control device for an internal combustion engine equipped with an intake vortex flow generating device. The intake vortex flow generating device can generate an intake vortex flow for promoting a combustion of a mixture gas in each cylinder of a multi-cylinder internal combustion engine (for example, a four-cylinder gasoline engine: hereinafter, referred to as an engine) mounted in an engine compartment of a vehicle such as an automobile.

The intake control device for the internal combustion engine, or particularly the intake vortex flow generating device, has multiple rotary intake flow control valves (tumble control valves: TCVs) installed respectively for combustion chambers of respective cylinders of the engine, multiple actuators independently driving respective valve members (rotary valves 1) of the rotary tumble control valves and an engine control unit (an engine control device: hereinafter, referred to as an ECU) for controlling throttle opening degrees corresponding to rotational angles of the multiple rotary valves 1 in association with respective systems such as an ignition device and a fuel injection device.

The rotary valve 1 according to the present embodiment is formed with a through passage 2 (a communication passage or a link-up passage) that has a circular cross-sectional shape (or a rectangular cross-sectional shape) and that is formed to penetrate through the rotary valve 1 in a direction perpendicular to a direction of a rotational axis line of the rotary valve 1. The rotary valve 1 has a first valve main body 3 in the shape of a flat plate, a second valve main body 4 in the shape of a flat plate, circular housings 5 (a pair of housings) and the like. The first and second valve main bodies 3, 4 are mechanically united to the single rotary valve 1 so that the first and second valve main bodies 3, 4 can move in conjunction with each other.

As shown in FIGS. 1 to 3E, the rotary tumble control valve according to the present embodiment constitutes a set of a valve unit with an intake manifold 6 (duct) constituting a part of an intake tube of the engine, the rotary valve 1 supported in a cylindrical portion 7 (housing) of the intake manifold 6 (particularly in a valve accommodation chamber 10 as a space having a circular cross-sectional shape) such that the rotary valve 1 can freely slide in a rotational direction of the rotary valve 1 therein and an actuator (not shown) driving a rotary shaft (not shown) of the rotary valve 1.

The intake vortex flow generating device according to the present embodiment has first and second intake throttle portions 11, 12 formed between the rotary valve 1 and the cylindrical portion 7 in the intake manifold 6 when engine rotation speed or an engine load (for example, an accelerator position) is equal to or lower than a threshold value, for example, when the engine is in a low rotation speed region or a low load region (more specially, when the engine is started, when idling operation is performed or when the engine is operated at low rotation speed and a low load). A second throttle portion 13 (through bore) is formed in the second valve main body 4 shown in FIGS. 3A and 3C to 3E. The threshold value means an upper limit value of the engine rotation speed (or the engine load) for obtaining an effect of fuel consumption improvement or an effect of early activation of a catalyst through generation of an intake vortex flow (a tumble flow) in the combustion chamber of the engine.

The engine is a water-cooled gasoline engine that produces an output by a thermal energy acquired by combusting a mixture gas of intake air and fuel in the combustion chamber. The adopted engine is a four-cycle engine of repeating the cycle of four strokes of an intake stroke, a compression stroke, an expansion stroke (a combustion stroke) and an exhaustion stroke. The engine has an intake tube for introducing intake air into the combustion chamber in each cylinder of the engine, an engine main body (consisting of a cylinder head 8 and a cylinder block 9) having multiple cylinders and an exhaust tube for discharging an exhaust gas flowing out from the combustion chamber in each cylinder of the engine to an outside.

The intake tube of the engine is a casing (an intake duct, an intake introduction duct) forming an intake passage for supplying the intake air into the combustion chamber in each cylinder of the engine. The intake tube includes an air cleaner case, an intake pipe, a surge tank, the intake manifold 6 and the like. A filter element 15 for filtering the intake air is accommodated in the air cleaner case. An airflow meter 16 is installed in the intake tube for sensing a flow rate of the intake air (an intake air quantity) supplied into the combustion chamber in each cylinder of the engine.

The intake manifold 6 includes the cylinder portion 7 in the middle thereof. The valve accommodation chamber 10 formed in the cylinder portion 7 has the circular cross-sectional shape and accommodates the rotary valve 1 such that the rotary valve 1 can freely rotate around its rotational axis line. The intake manifold 6 includes a first pipe portion 17 (an upstream side flow passage portion) in the shape of a circular pipe upstream of the valve accommodation chamber 10 with respect to the intake flow direction for each cylinder of the engine. The intake manifold 6 includes a second pipe portion 19 (a downstream side flow passage portion) in the shape of a rectangular pipe downstream of the valve accommodation chamber 10 with respect to the intake flow direction.

An ambient air introduction passage 20 (a common intake passage) for introducing an ambient air to an inside of the intake tube is formed inside the intake tube upstream of the intake manifold 6 with respect to the intake flow direction.

Figure 2A:
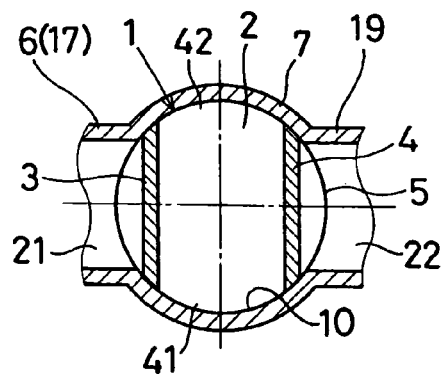
FIG. 2A is a cross-sectional view showing a fully-closed opening degree state of a rotary valve according to the first embodiment.
Figure 2B:
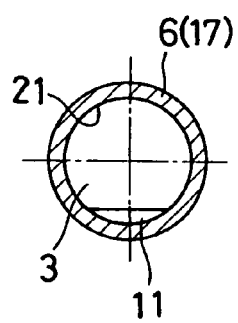
FIGS. 2B to 2E are cross-sectional views each showing a small opening degree state of the rotary valve according to the first embodiment.
Figure 2D:
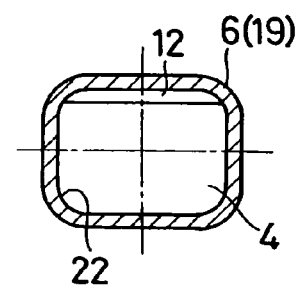
Figure 3A:
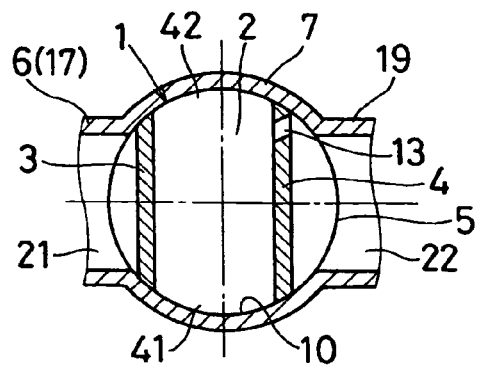
FIG. 3A is a cross-sectional view showing a fully-closed opening degree state of the rotary valve according to the first embodiment.
Figure 3B:
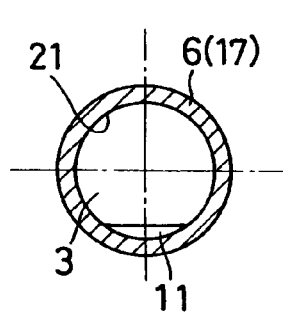
FIGS. 3B to 3D are cross-sectional views each showing a small opening degree state of the rotary valve according to the first embodiment.

As shown in FIGS. 2B and 3B, a first intake passage 21 having a circular cross-sectional shape is formed inside the first pipe portion 17. As shown in FIGS. 2D and 3D, a second intake passage 22 having a rectangular cross-sectional shape is formed inside the second pipe portion 19. Accordingly, the inside of the cylindrical portion 7 (i.e., the valve accommodation chamber 10) of the intake manifold 6 provides an intake passage connecting the first intake passage 21 and the second intake passage 22. That is, the first and second intake passages 21, 22 are connected in series through the rotary valve 1 or the valve accommodation chamber 10 for each cylinder of the engine.

The first and second intake passages 21, 22 constitute an independent intake passage of each cylinder such that the independent intake passage is connected independently to the combustion chamber in each cylinder of the engine. That is, the intake tube of the engine is constructed in such a manner that the ambient air (the intake air) flowing through the single ambient air introduction passage 20 branches into the multiplicity of the first and second intake passages 21, 22. As shown in FIG. 2E, the first intake passage 21 may be bent such that the first intake passage 21 turns in the middle substantially at the right angle. The second intake passage 22 may be bent such that the second intake passage 22 turns in the middle substantially at the right angle.

The engine main body is constructed of the cylinder head 8, the cylinder block 9 and the like. Multiple intake ports 23 (intake ports of the respective cylinders) are formed on one side of the cylinder head 8. Each intake port 23 has a three-dimensional intake passage shape and is opened/closed by a poppet type intake valve 24 (intake valve of each cylinder) corresponding to the intake port 23. The second pipe portion 19 of the intake manifold 6 is air-tightly connected to the upstream end of each intake port 23 with respect to the intake air flow direction.

Multiple exhaust ports 25 (exhaust ports of the respective cylinders) are formed on the other side of the cylinder head 8. Each exhaust port 25 has a three-dimensional exhaust passage shape and is opened/closed by a poppet type exhaust valve 26 (an exhaust valve of each cylinder) corresponding to each exhaust port 25. The exhaust tube is air-tightly connected to the downstream end of each exhaust port 25 with respect to in an exhaust gas flow direction.

A piston 27 connected to a crankshaft through a connecting rod is supported in each of multiple cylinder bores formed inside the cylinder block 9 of the engine such that the piston 27 can freely slide in a vertical direction in FIG. 1. A water jacket 28 is formed inside the cylinder head 8 and the cylinder block 9 to surround the periphery of the cylinder bore, for example.

A coolant temperature sensor 29 is mounted to the cylinder block 9 according to the present embodiment for sensing temperature of an engine coolant (i.e., coolant temperature) circulated and supplied in the water jacket 28 of the engine. A crank angle sensor (not shown) for outputting a crank angle signal (NE pulse signal) at every predetermined crank angle is attached to the vicinity of the crankshaft of the engine.

The exhaust tube of the engine is a casing (an exhaust duct, an exhaust gas lead-out duct) forming the exhaust passage for discharging an exhaust gas flowing out of the combustion chamber in each cylinder of the engine to an outside through an exhaust gas purification device 30. In the present embodiment, for example, a catalyst such as a three-way catalyst for purifying CO, HC, NOx and the like in the exhaust gas is adopted as the exhaust gas purification device 30. The exhaust tube includes an exhaust manifold 31, an exhaust pipe 32 and the like.

Multiple exhaust passages 33 (independent exhaust passages of the respective cylinders) independently connected to the combustion chambers in the respective cylinders of the engine are formed inside the exhaust manifold 31. A single exhaust passage (common exhaust passage) is formed inside the exhaust tube downstream of the exhaust manifold 31 with respect to the exhaust gas flow direction, that is, inside the exhaust pipe 32 or the like. The exhaust tube of the engine is constructed in such a manner that the exhaust gas flowing through the multiple exhaust passages 33 converges in the single exhaust passage.

An exhaust gas sensor 34 (an air-fuel ratio sensor or an oxygen sensor) is mounted to the exhaust tube according to the present embodiment for sensing a state of the exhaust gas (an air-fuel ratio or the like) flowing out of the combustion chamber in each cylinder of the engine.

The ignition device according to the present embodiment is a system for igniting and combusting the mixture gas in the combustion chamber in each cylinder of the engine when the mixture gas is compressed by a rise of the piston 27. The ignition device is constructed of an ignition coil generating a high voltage for igniting the mixture gas, a spark plug 35 for discharging a spark by current of the high voltage generated in the ignition coil to ignite the mixture gas and the like. The spark plug 35 is attached to the cylinder head 8 of the engine such that a tip end portion of the spark plug 35 is exposed into the combustion chamber in each cylinder.

The fuel injection device according to the present embodiment is a system that pressurizes the fuel (for example, gasoline) to certain pressure and sends the fuel to an electromagnetic fuel injection valve 36 (injector) through a fuel filter with the use of an electric fuel pump. The fuel injection device can inject the fuel at optimal timing. The fuel injection device injects and supplies the fuel into the intake port 23 of each cylinder of the engine.

The fuel injection device includes the injector 36 injecting the fuel, which is suctioned from a fuel tank, into the intake port 23 of each cylinder of the engine at the optimal timing and the like. The injector 36 is attached to the cylinder head 8 or the intake manifold 6 of the engine.

The ECU drives (i.e., controls energization of) the ignition device and the fuel injection device.

The rotary valve 1 has a single rotation axis (a rotation axis line) in a central axis line direction of the cylindrical portion 7 of the intake manifold 6, that is, in a direction perpendicular to the axis line direction of the first and second intake passages 21, 22. The rotation axis (the rotation axis line) of the rotary valve 1 is a rotation center of the first valve main body 3 as well as a rotation center of the second valve main body 4. Thus, the rotation axis line of the first valve main body 3 and the rotation axis line of the second valve main body 4 are provided on the same axis line.

The rotary valve 1 has the through passage 2 having the circular cross-sectional shape (or the rectangular cross-sectional shape) between the first and second valve main bodies 3, 4. The through passage 2 of the rotary valve 1 is a communication passage for connecting the first intake passage 21 and the second intake passage 22.

A first opening portion 41 having a circular cross-sectional shape (or a rectangular cross-sectional shape) is formed at a first opening end of the rotary valve 1, i.e., at an upstream opening end of the through passage 2 with respect to the intake flow direction. The first opening portion 41 is an intake air introduction port for introducing the intake air from the first intake passage 21 inside the intake manifold 6 to the through passage 2 inside the rotary valve 1, for example, when the rotary valve 1 is fully open (refer to FIG. 3E). The first opening portion 41 has substantially the same opening area as a passage cross-sectional area of the first intake passage 21.

When the rotary valve 1 is held (set) at an intermediate position between the fully closed position and the fully open position, the first opening portion 41 is partially open, that is, the first opening portion 41 partially communicates with the first intake passage 21. That is, when the rotary valve 1 (particularly, the first valve main body 3) is rotated (opened) around its rotational axis line (to a certain degree other than the fully open position), the first opening portion 41 serves as a first variable throttle portion for throttling the passage cross-sectional area of the first intake passage 21 in accordance with a rotational angle of the rotary valve 1 (particularly, the first valve main body 3).

A second opening portion 42 (an intake air lead-out port) having a circular cross-sectional shape (or a rectangular cross-sectional shape) is formed at a second opening end of the rotary valve 1, i.e., at a downstream opening end of the through passage 2 with respect to the intake flow direction. The second opening portion 42 is an intake air lead-out port for leading out the intake air from the through passage 2 inside the rotary valve 1 to the second intake passage 22 inside the intake manifold 6, for example, when the rotary valve 1 is at the fully open position (refer to FIG. 3E). The second opening portion 42 has substantially the same opening area as a passage cross-sectional area of the second intake passage 22.

When the rotary valve 1 is held (set) at an intermediate position between the fully closed position and the fully open position, the second opening portion 42 is partially open, that is, the second opening portion 42 partially communicates with the second intake passage 22. That is, when the rotary valve 1 (particularly, the second valve main body 4) is rotated (opened) around its rotational axis line (to a certain degree other than the fully open position), the second opening portion 42 serves as a second variable throttle portion for throttling the passage cross-sectional area of the second intake passage 22 in accordance with the rotational angle of the rotary valve 1 (particularly, the second valve main body 4).

An actuator for driving the rotary shaft of the rotary valve 1 in the valve-closing operation direction or in the valve-opening operation direction constitutes a single valve drive device capable of collectively varying the opening degrees (the rotational angles or the throttle opening degrees) of the first and second valve main bodies 3, 4 constituting the rotary valve 1 through the rotary shaft. The actuator is constructed of an electric motor generating a drive force (motor output shaft torque) by receiving power supply and a power transmission mechanism (a reduction gear mechanism in the present embodiment) for transmitting a rotational movement of a motor rotary shaft (an output shaft) of the electric motor to the rotary shaft.

A DC motor such as a brushless DC motor or a DC motor with a brush may be adopted as the electric motor. Alternatively, an AC motor such as a three-phase induction motor may be adopted as the electric motor.

The reduction gear mechanism reduces rotation speed of the motor shaft of the electric motor so as to realize a predetermined speed reduction ratio and constitutes the power transmission mechanism for transmitting the motor output shaft torque of the electric motor to the rotary shaft. The reduction gear mechanism includes a motor gear fixed to the motor shaft of the electric motor, an intermediate reduction gear meshing with the motor gear and a final reduction gear meshing with the intermediate reduction gear. A return spring (not shown) is attached to the rotary shaft or the final reduction gear. The return spring constitutes a valve biasing device for biasing the rotary valve 1 in the valve-closing operation direction.

An ECU controls energization of multiple actuators and particularly multiple electric motors. The ECU is constructed of a microcomputer having a known structure and having functions of CPU for performing control processing and calculation processing, a storage device (a memory such as RAM or ROM) for storing control programs or control logics and various data, an input circuit (an input section), an output circuit (an output section), a power source circuit, a timer and the like.

The ECU is constructed in such a manner that sensor signals of various sensors such as the crank angle sensor, the accelerator position sensor, the airflow meter 16, the coolant temperature sensor 29 and the exhaust gas sensor 34 are inputted into the microcomputer after A/D conversion of the sensor signals is performed by an A/D converter. The ECU serves as a rotation speed sensing device for sensing engine rotation speed NE by measuring an interval time between the NE pulse signals outputted by the crank angle sensor.

The ECU is constructed to perform energization control of the electric motor of the intake vortex flow generating device and drive the ignition device (the ignition coil, the spark plug 35 and the like) and the fuel injection device (the electric fuel pump, the injector 36 and the like) based upon the control programs or the control logics stored in the memory when the ignition switch is turned on (IG•ON). Thus, the throttle opening degree of the rotary valve 1, the intake air quantity, the fuel injection quantity and the like are controlled to respective control command values (control target values) during the operation of the engine.

The throttle opening degree of the rotary valve 1 is controlled to a target throttle opening degree calculated in accordance with an operating region of the engine (such as a low rotation speed region, an intermediate rotation speed region or a high rotation speed region) or to a target throttle opening degree calculated in accordance with an accelerator position signal outputted by the accelerator position sensor (such as a low load region, an intermediate load region or a high load region). The throttle opening degree of the rotary valve 1 changes stepwise or continuously over the entire operating region of the engine.

The ECU is constructed so that the engine control and the like including the ignition control, the fuel injection control and the like performed based upon the control programs or the control logics stored in the memory are forcibly terminated when the ignition switch is turned off (IG•OFF).

The ECU is configured to be able to control the rotational position (the rotational angle, the throttle opening degree) of the rotary valve 1 over an entire valve operable range (entire valve rotatable range) of the rotary valve 1 from a fully closed position to a fully open position via an intermediate position by variably controlling the power supply to the electric motor in response to an operating state of the engine (for example, the engine rotation speed or the engine load (the accelerator position or the like)). The fully closed position is a state of a fully-closed opening degree where the rotary valve 1 is fully closed (refer to FIG. 2A or 3A). The fully open position is a state of a fully-open opening degree where the rotary valve 1 is fully open (refer to FIG. 3E). The intermediate position is a state where the rotary valve 1 is slightly opened in the valve-opening operation direction from the fully closed position, that is, a state where the rotary valve 1 is half-open at an intermediate opening degree (i.e., a small opening degree) (refer to FIG. 2C or 3C).

The fully closed position of the rotary valve 1 corresponds to a rotational angle (a throttle angle) at which the first and second intake passages 21, 22 are fully closed (or closed) so that the passage cross-sectional areas of the first and second intake passages 21, 22 become zero.

The fully open position of the rotary valve 1 corresponds to a rotational angle (a throttle angle) at which the first and second intake passages 21, 22 are fully opened (opened) so that the passage cross-sectional areas of the first and second intake passages 21, 22 are maximized.

The intermediate position of the rotary valve 1 corresponds to an intermediate opening degree (or a small opening degree), to which the rotary valve 1 is opened in the valve-opening operation direction by a predetermined rotational angle (for example, an angle approximately in a range from 5 degrees to 45 degrees) from the fully closed position, that is, a rotational angle (a throttle opening degree) for throttling (opening) the first and second intake passages 21, 22 to achieve predetermined passage cross-sectional areas of the first and second intake passages 21, 22.

When the first valve main body 3 rotates around the rotational axis line of the rotary valve 1, the first valve main body 3 throttles the intake passage (particularly, the first and second intake passages 21, 22 of the intake manifold 6) to the engine in accordance with the rotational angle (i.e., the throttle opening degree). Thus, the first valve main body 3 serves as a rotary throttle valve that varies the intake air quantity supplied into the combustion of each cylinder of the engine. The first valve main body 3 is located upstream of the second valve main body 4 inside the valve accommodation chamber 10 (the intake passage) with respect to the intake flow direction and is bridged between a pair of housings 5.

The first valve main body 3 rotates relatively to the cylindrical portion 7 of the intake manifold 6 to open/close the intake passage (particularly, the first and second intake passages 21, 22 of the intake manifold 6) to the engine.

Figure 2C:
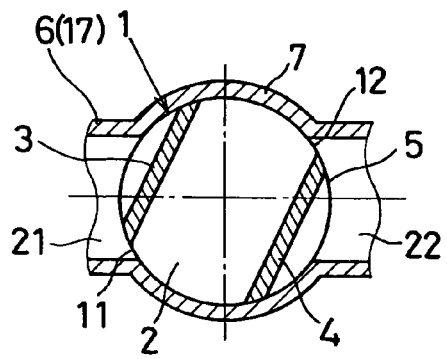
Figure 2E:
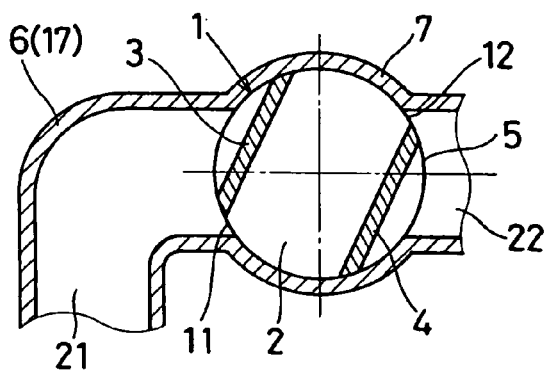
Figure 3C:
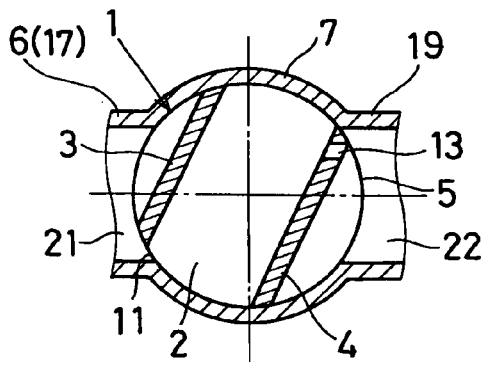
Figure 3D:
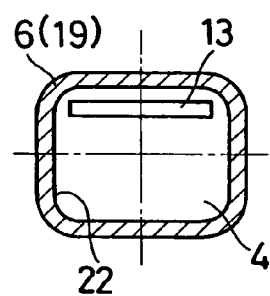

The first valve main body 3 is held to be (slightly) opened in the valve-opening operation direction from the fully closed position of the rotary valve 1, that is, to a half-open state of an intermediate opening degree (a small opening degree), when the engine is in the low rotation speed region or the low load region (refer to FIG. 2C, 2E or 3C).

The second valve main body 4 throttles the intake passage (particularly, the first and second intake passages 21, 22 of the intake manifold 6) to the engine in accordance with its rotational angle (i.e., the throttle angle) when the second valve main body 4 rotates around the rotational axis line of the rotary valve 1, particularly in the case where the engine is in the low rotation speed region or the low load region. Thus, the second valve main body 4 serves as a rotary intake flow control valve (a tumble control valve) for generating an intake vortex flow (intake fluidity) in the intake air supplied into the combustion chamber in each cylinder of the engine. The second valve main body 4 is located downstream of the first valve main body 3 with respect to the intake flow direction inside the valve accommodation chamber 10 and is bridged between the pair of the housings 5.

The second valve main body 4 rotates relatively to the cylindrical portion 7 of the intake manifold 6 to open/close the intake passage (particularly, the first and second intake passages 21, 22 of the intake manifold 6) to the engine.

The second valve main body 4 is held to be slightly opened in the valve-opening operation direction from the fully closed position of the rotary valve 1, that is, to a half-open state of an intermediate opening degree (a small opening degree), when the engine is in the low rotation speed region or the low load region (refer to FIG. 2C, 2E or 3C).

The pair of the housings 5 are located on both sides of the rotation axis direction (the rotation axis line direction) of the rotary valve 1 and serve as a partition wall partitioning an inside and an outside of the intake manifold 6. At least one of the pair of the housings 5 is integrated with the rotary shaft (the rotary shaft of the rotary valve 1) rotated and driven by the actuator.

The first intake throttle portion 11 is formed between the lower end portion (in the figure) of the first valve main body 3 and the cylindrical portion 7 of the intake manifold 6 if the rotary valve 1 rotates around its rotational axis line and the first valve main body 3 is held at the state of the intermediate opening degree (the small opening degree) when the engine is in the low rotation speed region or the low load region (for example, when the engine start-up is performed, when the engine idling operation is performed, or when the engine is operated at the low speed and the low load). The first intake throttle portion 11 is a part of the first opening portion 41 (the first variable throttle portion) for throttling the first and second intake passages 21, 22 in accordance with a change of the rotational angle of the rotary valve 1, i.e., a change of the rotational angle of the first valve main body 3, to control the intake air quantity flowing through the inside of the intake manifold 6.

The second intake throttle portion 12 is formed between the upper end portion (in the figure) of the second valve main body 4 and the cylindrical portion 7 of the intake manifold 6 if the rotary valve 1 rotates around its rotational axis line and the second valve main body 4 is held at the state of the intermediate opening degree (the small opening degree) when the engine is in the low rotation speed region or the low load region (for example, when the engine start-up is performed, when the engine idling operation is performed or when the operation of the engine at the low speed and the low load is performed). The second intake throttle portion 12 is a part of the second opening portion 42 (the second variable throttle portion) for throttling the first and second intake passages 21, 22 in accordance with a change of the rotational angle of the rotary valve 1, i.e., a change of the rotational angle of the second valve main body 4. The second intake throttle portion 12 strengthens an air flow passing through the second intake throttle portion 12 when the engine is in the low rotation speed region or the low load region, thus generating an intake vortex flow (a tumble flow) in the longitudinal direction in the combustion chamber in each cylinder of the engine. That is, the second intake throttle portion 12 constitutes a tumble port capable of strengthening the tumble flow when the engine is in the low rotation speed region or the low load region.

The through bore 13 is formed in the second valve main body 4 such that the through bore 13 provides communication between both end surfaces of the second valve main body 4 in plate thickness direction of the second valve main body 4 and such that the through bore 13 becomes parallel to the central axis direction of the valve accommodation chamber 10 or the first and second intake passages 21, 22 when the engine is in the low rotation speed region or the low load region. The through bore 13 has a rectangular cross-sectional shape. The through bore 13 is a second throttle portion capable of throttling the first and second intake passages 21, 22 regardless of a change of the rotational angle of the rotary valve 1, that is, a change of the rotational angle of the second valve main body 4 (over an entire operating region of the engine). The through bore 13 strengthens the air flow passing through the through bore 13 when the engine is in the low rotation speed region or the low load region, thus generating the intake vortex flow (the tumble flow) in the longitudinal direction in the combustion chamber in each cylinder of the engine. That is, the through bore 13 constitutes the tumble port capable of strengthening the tumble flow when the engine is in the low rotation speed region or the low load region.

In the intake vortex flow generating device according to the present embodiment, as shown FIGS. 1 and 2B to 2E, passage shapes of the intake tube of the engine or particularly the passage shapes of the first and second pipe portions 17, 19 of the intake manifold 6 are differentiated such that the passage cross-sectional area of the second intake passage 22 formed downstream (i.e., on the intake port side) of the rotational axis line of the rotary valve 1 with respect to the intake flow direction is larger than that of the first intake passage 21 formed upstream (i.e., on the surge tank side or on a side opposite to the intake port side) of the rotational axis line of the rotary valve 1 with respect to the intake flow direction when the engine is in the low rotation speed region or the low load region where the tumble flow in the combustion chamber in each cylinder of the engine is required.

In the present embodiment, in order to make the passage cross-sectional area of the second intake passage 22 formed inside the second pipe portion 19 larger than that of the first intake passage 21 formed inside the first pipe portion 17 when the engine is in the low rotation speed region or the low load region, the cross-sectional shape of the first intake passage 21 is formed in the circular shape and the cross-sectional shape of the second intake passage 22 is formed in the rectangular shape. A horizontal dimension (passage width) of the rectangular shape of the second intake passage 22 perpendicular to a direction of a gravitational force (i.e., the vertical direction in the figure) of the second intake passage 22 is larger than a dimension of the rectangular shape in the direction of the gravitational force (passage height) of the second intake passage 22.

Thus, the opening area of the second intake throttle portion 12 is set larger than that of the first intake throttle portion 11 when the engine is in the low rotation speed region or the low load region, that is, when the rotary valve 1 is held at the state of the intermediate opening degree (the small opening degree), as shown in FIGS. 2B to 2E. That is, the opening area of the second intake throttle portion 12 becomes larger than that of the first intake throttle portion 11 when the engine is in the low rotation speed region or the low load region.

In the intake vortex flow generating device according to the present embodiment, as shown FIGS. 3B to 3D, the passage shapes of the intake tube of the engine or particularly the passage shapes of the first and second pipe portions 17, 19 are differentiated to make the passage cross-sectional area of the second intake throttle portion 22 larger than that of the first intake throttle portion 21 when the engine is in the low rotation speed region or the low load region. In the present embodiment, as in the case of the rotary valve 1 shown in FIGS. 2A to 2E, the cross-sectional shape of the first intake passage 21 is formed in the circular shape and the cross-sectional shape of the second intake passage 22 is formed in the rectangular shape.

The second valve main body 4 of the intake vortex flow generating device according to the present embodiment has the through bore 13 with the rectangular cross-sectional shape, through which the intake flow passes in a predetermined operating region that includes the low rotation speed region and the low load region of the engine but excludes the region where the rotary valve 1 is fully closed or fully open. The through bore 13 is positioned in an upper portion of the second intake passage 22 with respect to the direction of the gravitational force and has an opening area larger than that of the first intake throttle portion 11. In the case of the rotary valve 1 shown in FIGS. 3A to 3E, the second intake throttle portion 12 is not opened but only the through bore 13 is opened when the engine is in the low rotation speed region or the low load region.

Thus, when the engine is in the low rotation speed region or the low load region, that is, when the rotary valve 1 is held at the state of the intermediate opening degree (the small opening degree), as shown in FIGS. 3B to 3D, the opening area of the through bore 13 is set larger than that of the first intake throttle portion 11. That is, when the engine is in the low rotation speed region or the low load region, the opening area of the through bore 13 serving as the second throttle portion becomes larger than that of the first intake throttle portion 11.

Next, an operation of the intake control device (the intake vortex flow generating device) of the internal combustion engine according to the present embodiment will be explained with reference to FIGS. 1 to 3E.

When the ignition switch is turned on (IG•ON), the ECU drives the ignition device (the ignition coil, the spark plug 35 and the like) and the fuel injection device (the electric fuel pump, the injector 36 and the like). In consequence, the engine starts to operate.

At this point, when a specific cylinder of the engine transfers from the exhaust stroke to the intake stroke where the intake valve 24 opens and the piston 27 descends, negative pressure (pressure lower than atmospheric pressure) in the combustion chamber in the specific cylinder increases in accordance with the descent of the piston 27. As a result, a mixture gas is taken into the combustion chamber from the opening intake port 23.

Figure 3E:
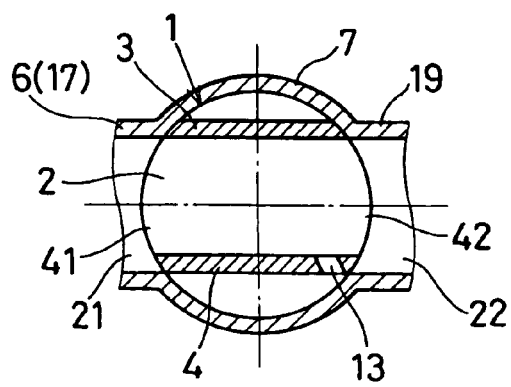
FIG. 3E is a cross-sectional view showing a fully-open opening degree state of the rotary valve according to the first embodiment.

The ECU controls the power supplied to the electric motor (for example, the ECU energizes the electric motor) when the engine is already warm and requires a large intake air quantity to the engine (for example, during a normal operation of the engine). At this time, the rotary valve 1 is opened since the rotary valve 1 is driven in the valve-opening operation direction by using the driving force of the electric motor. That is, as shown in FIG. 3E, the rotary valve 1 is held (controlled) at the state of the fully-open opening degree where the rotary valve 1 is opened to the fully open position.

In this case, the intake flow that is filtered by the filter element 15 and that flows into the first intake passage 21 of the intake manifold 6 from the ambient air introduction passage 20 passes through the inside (i.e., the through passage 2) of the rotary valve 1 straight from the first opening portion 41 toward the second opening portion 42 and flows into the second intake passage 22 of the intake manifold 6. The intake flow flowing into the second intake passage 22 is introduced from the second intake passage 22 into the intake port 23 formed in the engine main body.

The intake flow introduced into the intake port 23 is supplied into the combustion chamber from an intake valve hole (an opening) of the intake port 23. At this point, the intake vortex flow (the tumble flow) in the longitudinal direction does not occur in the combustion chamber of the engine.

When the ignition switch is turned off (IG•OFF), the ECU stops the drive of the ignition device and the fuel injection device. In consequence, the engine is completely stopped. Further, the ECU controls the power supplied to the electric motor (for example, the ECU stops the energization to the electric motor). At this time, since the rotary valve 1 is returned to the fully closed position by the biasing force of the return spring, the rotary valve 1 is closed. That is, as shown in FIG. 2A or 3A, the rotary valve 1 is biased (held) at the state of the fully-closed opening degree where the rotary valve 1 is closed to the fully closed position.

The ECU controls the power supplied to the electric motor (for example, the ECU energizes the electric motor) when the engine is cold and only a small intake air quantity is required by the engine, that is, when the engine is in the low rotation speed region or the low load region (for example, when the engine start-up is performed, when the engine idling operation is performed or when the engine is operated at the low speed and the low load) where the tumble flow is necessary in the combustion chamber in each cylinder of the engine. In consequence, as shown in FIGS. 2B to 2E or FIGS. 3B to 3D, the rotary valve 1 is held (controlled) at a state where the rotary valve 1 is slightly opened in the valve-opening operation direction (i.e., in a normal rotational direction) from the fully closed position, i.e., to a state of the intermediate opening degree (the small opening degree) where the rotary valve 1 is half-open.

In this case, the intake flow flowing into the first intake passage 21 of the intake manifold 6 from the ambient air introduction passage 20 passes through the first intake throttle portion 11 formed between the first valve main body 3 of the rotary valve 1 and the cylindrical portion 7 of the intake manifold 6 and then flows into an inside of the rotary valve 1 (i.e., the through passage 2) as shown in FIGS. 1, 2C and 3C. The intake flow flowing into the through passage 2 passes through the second intake throttle portion 12 formed between the second valve main body 4 of the rotary valve 1 and the cylindrical portion 7 of the intake manifold 6 or the through bore 13 formed to penetrate through the second valve main body 4. At this time, a strong intake flow blows out from the second intake throttle portion 12 or the through bore 13 opening at an upper portion (in the figure) of the rotary valve 1 and flows into the second intake passage 22 of the intake manifold 6.

As shown in FIG. 1, the intake flow flowing into the second intake passage 22 is introduced into an upper layer portion of the intake port 23 from the intake manifold 6 and flows along the ceiling wall surface of the upper layer portion of the intake port 23. The intake flow flowing along the ceiling wall surface of the upper layer portion of the intake port 23 is supplied into the combustion chamber from the intake valve hole of the intake port 23. At this time, the intake flow flowing into the combustion chamber from the intake port 23 changes into the tumble flow due to the intake port shape (a port shape smoothly bent in an arc shape) and a valve-opening state of the intake valve 24.

Accordingly, since the strong tumble flow is generated in the combustion chamber in each cylinder of the engine, the fuel introduced into the combustion chamber together with the intake air spreads out substantially uniformly over an entire space in the combustion chamber, so the combustion is performed efficiently. Thus, the combustion efficiency in the combustion chamber in the low rotation speed region or the low load region of the engine can be improved. As a result, the fuel consumption, the power output, the exhaust emission (for example, a HC reduction effect) and the like can be improved significantly.

As described above, in the intake vortex flow generating device according to the present embodiment, the passage shapes of the first and second pipe portions 17, 19 of the intake manifold 6 are differentiated so that the passage cross-sectional area of the second intake passage 22 is larger than that of the first intake passage 21 when the engine is in the low rotation speed region or the low load region. In the embodiment, the cross-sectional shape of the first intake passage 21 is formed in the circular shape and the cross-sectional shape of the second intake passage 22 is formed in the rectangular shape. In consequence, as shown in FIGS. 2B to 2E or FIGS. 3B to 3D, the opening area of the second intake throttle portion 12 or the through bore 13 can be made larger than that of the first intake throttle portion 11 when the engine is in the low rotation speed region or the low load region.

Thus, the opening area of the second intake throttle portion 12 or the through bore 13 can be made larger than that of the first intake throttle portion 11 even when the opening area of the first intake throttle portion 11 is narrow and the intake air quantity supplied into the combustion chamber in each cylinder of the engine is smaller than in a normal operation of the engine as in the case where the engine is in the low rotation speed region or the low load region. Accordingly, there is no need to increase or decrease the throttle opening degree of the rotary valve 1 to the optimum opening degree when the engine is in the low rotation speed range or the low load range. Therefore, the intake quantity necessary for the operation at the engine start-up, the engine idling operation or the engine operation at the low speed and the low load can be achieved (secured).

Further, rapid thinning of the intake flow passing through the second intake throttle portion 12 or the through bore 13 having the larger opening area than that of the first intake throttle portion 11 or rapid reduction of the passage area(s) of the through passage 2 or the first and second intake passages 21, 22 can be prevented when the engine is in the low speed region or the low load region. Accordingly, the intake flow passing through the second intake throttle portion 12 or the through bore 13 becomes a relatively thick or wide intake flow along the ceiling wall surface of the intake port 23 of the engine. Therefore, a strong tumble flow is generated in the combustion chamber in each cylinder of the engine. Thus, an intended strong tumble flow in accordance with a demand for improving the fuel consumption and the like by improving the combustion efficiency in the combustion chamber in each cylinder of the engine can be generated in the combustion chamber in each cylinder of the engine.

Next, a second embodiment of the present invention will be described with reference to FIGS. 4A to 4D. FIG. 4A is a diagram showing a state of the fully-closed opening degree where the rotary valve 1 is fully closed. FIGS. 4B to 4D are diagrams each showing a state of the small opening degree where the rotary valve 1 is rotated in a reverse rotational direction.

In the intake vortex flow generating device according to the present embodiment, as shown in FIGS. 4B to 4D, the passage shapes of the intake tube of the engine or particularly the passage shapes of the first and second pipe portions 17, 19 are differentiated such that the passage cross-sectional area of the second intake passage 22 becomes larger than that of the first intake passage 21 when the engine is in the low rotation speed region or the low load region. Specifically, in the present embodiment, the cross-sectional shape of the first intake passage 21 is formed in a circular shape and the cross-sectional shape of the second intake passage 22 is formed in a rectangular shape as in the case of the rotary valve 1 shown in FIGS. 2A to 2E.

In the case of the intake vortex flow generating device according to the present embodiment, the rotary valve 1 is rotated in a reverse direction around the central axis line thereof (i.e., rotated in a direction opposite to the valve-opening operation direction (i.e., the normal rotational direction) shown in FIGS. 2A to 2E and 3A to 3E) when the engine is in the low rotation speed region or the low load region. In consequence, the rotary valve 1 is held (controlled) at a half-open state of a small opening degree where the rotary valve 1 is slightly opened in the valve-closing operation direction (the reverse rotational direction) from the fully closed position (refer to FIGS. 4B to 4D) when the engine is in the low rotation speed region or the low load region.

At this time, the first intake throttle portion 11 is formed upstream of the through passage 2 of the rotary valve 1 with respect to the intake flow direction, i.e., between the upper end portion (in the figure) of the first valve main body 3 and the cylindrical portion 7 of the intake manifold 6. The first intake throttle portion 11 throttles the intake passage (particularly the first and second intake passages 21, 22 of the intake manifold 6) to the engine in accordance with the rotational angle (the throttle opening degree) of the first valve main body 3.

In addition, the second intake throttle portion 12 is formed downstream of the through passage 2 of the rotary valve 1 with respect to the intake air flow direction, i.e., between the lower end portion (in the figure) of the second valve main body 4 and the cylindrical portion 7 of the intake manifold 6. The second intake throttle portion 12 throttles the intake passage (particularly the first and second intake passages 21, 22 of the intake manifold 6) to the engine in accordance with the rotational angle (the throttle opening degree) of the second valve main body 4. Thus, a strong intake flow blows out from the second intake throttle portion 12 opening in the lower portion (in the figure) of the rotary valve 1 and flows into the combustion chamber in each cylinder of the engine through the second intake passage 22 of the intake manifold 6, creating a strong tumble flow therein.

In the intake vortex flow generating device according to the present embodiment, as in the first embodiment, the passage shapes of the first and second pipe portions 17, 19 of the intake manifold 6 are differentiated. Thus, the opening area of the second intake throttle portion 12 can be made larger than that of the first intake throttle portion 11 as shown in FIGS. 4B to 4D even when the opening area of the first intake throttle portion 11 is narrow and the intake air quantity supplied into the combustion chamber in each cylinder of the engine is relatively small as in the case where the engine is in the low rotation speed region or the low load region.

Thus, when the engine is in the low rotation speed region or the low load region, an intended strong tumble flow in accordance with a demand for improving the fuel consumption and the like by improving the combustion efficiency in the combustion chamber in each cylinder of the engine can be generated in the combustion chamber in each cylinder of the engine while achieving the intake air quantity required in the engine start-up, the idling operation of the engine or the low speed and low load operation of the engine.

Figure 5A:
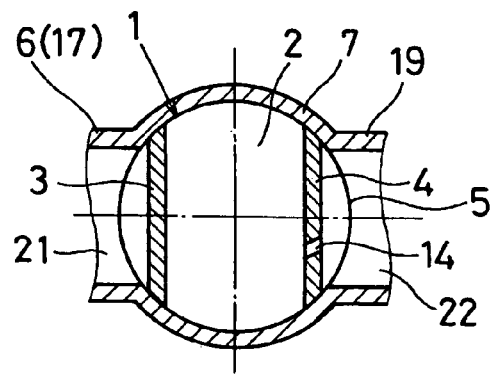
FIG. 5A is a cross-sectional view showing a fully-closed opening degree state of a rotary valve according to a third embodiment of the present invention.
Figure 5B:
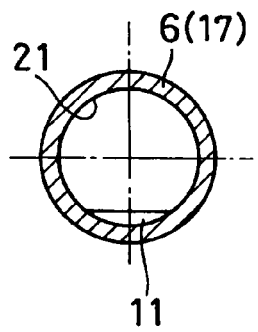
FIGS. 5B to 5D are cross-sectional views each showing a small opening degree state of the rotary valve according to the third embodiment.
Figure 5C:
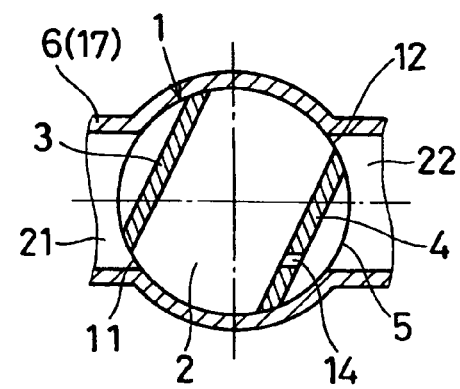
Figure 5D:
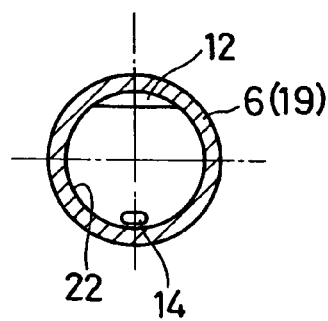

Next, a third embodiment of the present invention will be described with reference to FIGS. 5A to 5D. FIG. 5A is a diagram showing a state of a fully-closed opening degree where the rotary valve 1 is fully closed. FIGS. 5B to 5D are diagrams each showing a state of a small opening degree where the rotary valve 1 is open.

The intake manifold 6 has a second pipe portion 19 (downstream-side flow passage portion) in the shape of a circular pipe downstream of the valve accommodation chamber 10 with respect to the intake flow direction. A second intake passage 22 having a circular cross-sectional shape is formed inside the second pipe portion 19 as shown in FIG. 5D.

In the intake vortex flow generating device according to the present embodiment, a through bore 14 having an oval cross-sectional shape is formed in the lower portion (in the figure) of the second valve main body 4 as shown in FIGS. 5A, 5C and 5D. The through bore 14 penetrates through the second valve main body 4 to provide communication between both end surfaces of the second valve main body 4. The through bore 14 provides a subsidiary opening portion having an opening area smaller than that of the second intake throttle portion 12 that opens when the engine is in the low rotation speed region or the low load region.

In this case, even if both of the first and second pipe portions 17, 19 are formed in the circular pipes respectively, a total opening area on the second valve main body 4 side (i.e., the sum of the opening area of the second intake throttle portion 12 and the opening area of the through bore 14) becomes larger than that of the first intake throttle portion 11 when the engine is in the low rotation speed region or the low load region since the through bore 14 is formed.

If the second intake throttle portion 12 is formed between the upper end portion (in the figure) of the second valve main body 4 and the cylindrical portion 7 of the intake manifold 6, there is a possibility that a liquid pool of the fuel (residual gasoline) is produced in a downstream neighborhood of the rotary valve 1 when the engine is in the low rotation speed region or the low load region. If the fuel in the liquid pool flows into the combustion chamber at once because of some causes such as inclination of the vehicle, incomplete combustion can be caused.

The intake vortex flow generating device according to the present embodiment can generate the tumble flow in the combustion chamber in each cylinder of the engine when the engine is in the low rotation speed region or the low load region to improve the combustion efficiency in the combustion chamber in each cylinder of the engine so that the fuel consumption and the like are improved. When the rotary valve 1 is slightly opened in the valve-opening operation direction from the fully-closed position, i.e., when the rotary valve 1 is controlled to the half-open state of the small opening degree, in the low rotation speed region or the low load region of the engine as shown in FIGS. 5B to 5D, the intake vortex flow generating device according to the present embodiment sends a main intake flow passing through the second intake throttle portion 12 (a main opening portion) formed between the second valve main body 4 of the rotary valve 1 and the cylindrical portion 7 of the intake manifold 6 into each intake port. At the same time, the intake vortex flow generating device according to the present embodiment also sends a subsidiary intake flow flowing out of the through bore 14 formed in the rotary valve 1 into each intake port to cancel an airflow turning back as a part of the main intake flow. Thus, the liquid pool of the fuel in the downstream neighborhood of the rotary valve 1 can be prevented.

In the intake vortex flow generating device according to the present embodiment, the passage shapes of the first and second pipe portions 17, 19 of the intake manifold 6 are formed in the shapes of the circular pipes respectively. Not only the second intake throttle portion 12 but also the through bore 14 is formed on the downstream side of the rotary valve 1. In consequence, as shown in FIGS. 5B to 5D, the total opening area (i.e., the sum of the opening area of the second intake throttle portion 12 and the opening area of the through bore 14) on the second valve main body side can be made larger than that of the first intake throttle portion 11 even when the opening area of the first intake throttle portion 11 is narrow and the intake air quantity supplied into the combustion chamber in each cylinder of the engine is relatively small as in the case where the engine is in the low rotation speed region or the low load region. Therefore, also the intake vortex flow generating device according to the present embodiment can exert the effect similar to that of the first embodiment.

Next, a fourth embodiment of the present invention will be described with reference to FIGS. 6A to 6E. FIG. 6A is a diagram showing a state of the fully-closed opening degree where the rotary valve 1 is fully closed. FIGS. 6B to 6D are diagrams each showing a state of the small opening degree where the rotary valve 1 is open. FIG. 6E is a diagram showing a state of the fully-open opening degree where the rotary valve 1 is fully open.

In the intake vortex flow generating device according to the present embodiment, as shown in FIGS. 6A to 6E, a size of the second valve main body 4 of the rotary valve 1 in a plate length direction (i.e., plate length of the second valve main body 4) perpendicular to a plate thickness direction thereof is set shorter than a size of the first valve main body 3 of the rotary valve 1 in a plate length direction (i.e., plate length of the first valve main body 3) perpendicular to a plate thickness direction thereof. That is, the shapes (sizes in the plate length direction) of the first and second valve main bodies 3, 4 mechanically united to the single rotary valve 1 are differentiated (changed from each other). In consequence, as shown in FIGS. 6B to 6D, the opening area of the second intake throttle portion 12 can be made larger than that of the first intake throttle portion 11 even when the opening area of the first intake throttle portion 11 is narrow and the intake air quantity supplied into the combustion chamber in each cylinder of the engine is relatively small as in the case where the engine is in the low rotation speed region or the low load region. Thus, the intake vortex flow generating device according to the present embodiment can exert an effect similar to that of the first embodiment.

Figure 7A:
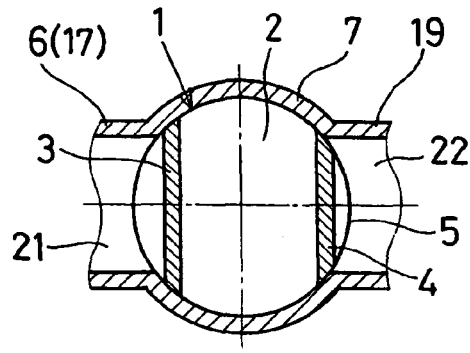
FIG. 7A is a cross-sectional view showing a fully-closed opening degree state of a rotary valve according to a fifth embodiment of the present invention.
Figure 7B:
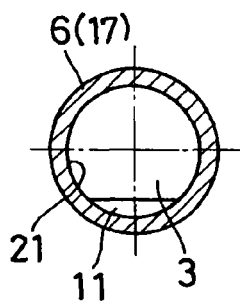
FIGS. 7B to 7D are cross-sectional views each showing a small opening degree state of the rotary valve according to the fifth embodiment.
Figure 7C:
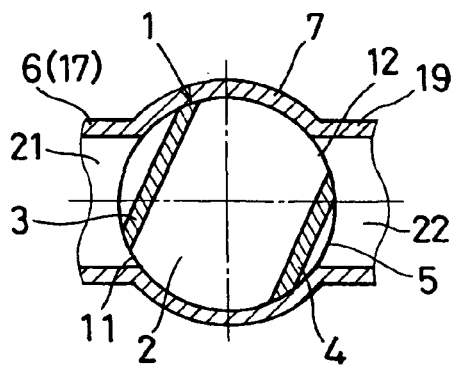
Figure 7D:
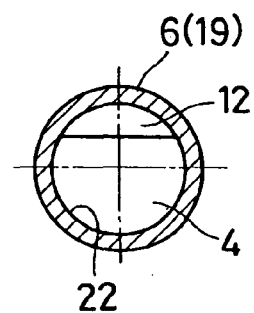
Figure 7E:
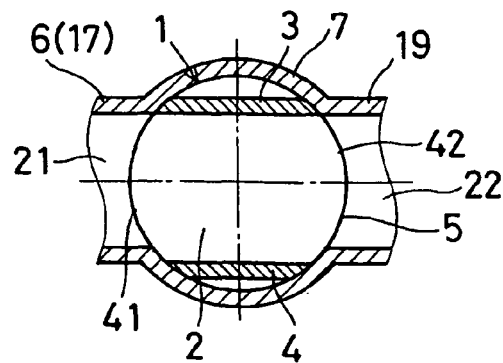
FIG. 7E is a cross-sectional view showing a fully-open opening degree state of the rotary valve according to the fifth embodiment.

Next, a fifth embodiment of the present invention will be described with reference to FIGS. 7A to 7E. FIG. 7A is a diagram showing a state of the fully-closed opening degree where the rotary valve 1 is fully closed. FIGS. 7B to 7D are diagrams each showing a state of the small opening degree where the rotary valve 1 is open. FIG. 7E is a diagram showing a state of the fully-open opening degree where the rotary valve 1 is fully open.

In the intake vortex flow generating device according to the present embodiment, as in the case of the first to fourth embodiments, the rotary valve 1 is constructed by mechanically connecting the first and second valve main bodies 3, 4 by the pair of housings 5.

In the intake vortex flow generating device according to the present embodiment, as shown in FIG. 7A, the second valve main body 4 has a formation position of a central portion closer to an outer peripheral portion of the circular housing 5 than a formation position of a central portion of the first valve main body 3 is, for example, when the rotary valve 1 is fully closed. That is, the formation positions of the first and second valve main bodies 3, 4 with respect to the outer peripheral portion of the housing 5 of the single rotary valve 1 are differentiated (changed from each other). In consequence, as shown in FIGS. 7B to 7D, the opening area of the second intake throttle portion 12 can be made larger than that of the first intake throttle portion 11 even when the opening area of the first intake throttle portion 11 is narrow and the intake air quantity supplied into the combustion chamber in each cylinder of the engine is relatively small as in the case where the engine is in the low rotation speed region or the low load region. Accordingly, also the intake vortex flow generating device according to the present embodiment can exert an effect similar to that of the first embodiment.

Figure 8A:
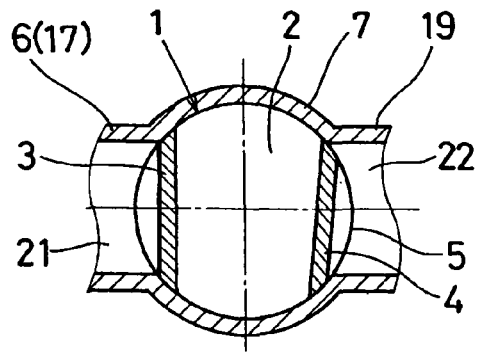
FIG. 8A is a cross-sectional view showing a fully-closed opening degree state of a rotary valve according to a sixth embodiment of the present invention.
Figure 8B:
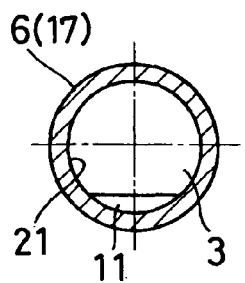
FIGS. 8B to 8D are cross-sectional views each showing a small opening degree state of the rotary valve according to the sixth embodiment.
Figure 8C:
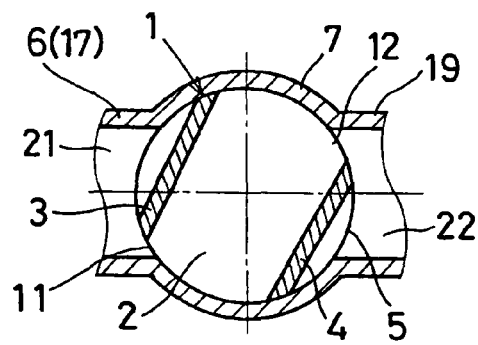
Figure 8D:
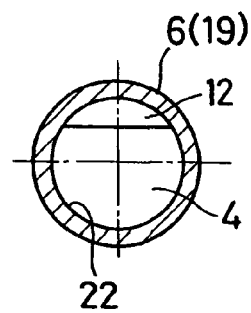
Figure 8E:
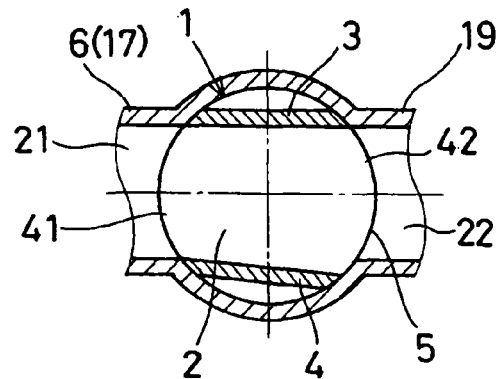
FIG. 8E is a cross-sectional view showing a fully-open opening degree state of the rotary valve according to the sixth embodiment.

Next, a sixth embodiment of the present invention will be described with reference to FIGS. 8A to 8E. FIG. 8A is a diagram showing a state of the fully-closed opening degree where the rotary valve 1 is fully closed. FIGS. 8B to 8D are diagrams each showing a state of the small opening degree where the rotary valve 1 is open. FIG. 8E is a diagram showing a state of the fully-open opening degree where the rotary valve 1 is fully open.

In the intake vortex flow generating device according to the present embodiment, as shown in FIG. 8A, an inclination angle of the second valve main body 4 with respect to a vertical line of the rotational axis line of the rotary valve 1 (particularly, the rotational axis line of the second valve main body 4) at the time when the rotary valve 1 is fully closed is set larger than an inclination angle of the first valve main body 3 with respect to a vertical line of the rotational axis line of the rotary valve 1 (particularly, the rotational axis line of the first valve main body 3) at the time when the rotary valve 1 is fully closed. That is, the inclination angles of the first and second valve main bodies 3, 4 of the single rotary valve 1 are differentiated (changed from each other). In consequence, as shown in FIGS. 8B to 8D, the opening area of the second intake throttle portion 12 can be made larger than that of the first intake throttle portion 11 even when the opening area of the first intake throttle portion 11 is narrow and the intake air quantity supplied into the combustion chamber in each cylinder of the engine is relatively small as in the case where the engine is in the low rotation speed region or the low load region. Accordingly, also the intake vortex flow generating device according to the present embodiment can exert an effect similar to that of the first embodiment.

Figure 9A:
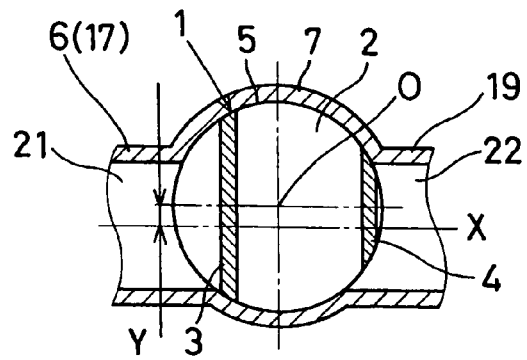
FIG. 9A is a cross-sectional view showing a fully-closed opening degree state of a rotary valve according to a seventh embodiment of the present invention.
Figure 9B:
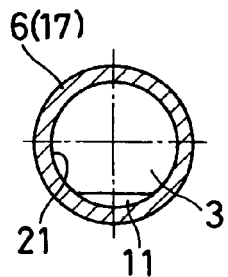
FIGS. 9B to 9D are cross-sectional views each showing a small opening degree state of the rotary valve according to the seventh embodiment.
Figure 9C:
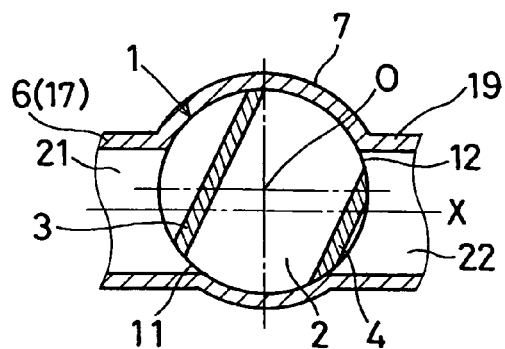
Figure 9D:
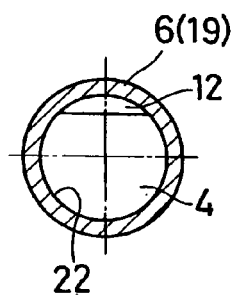
Figure 9E:
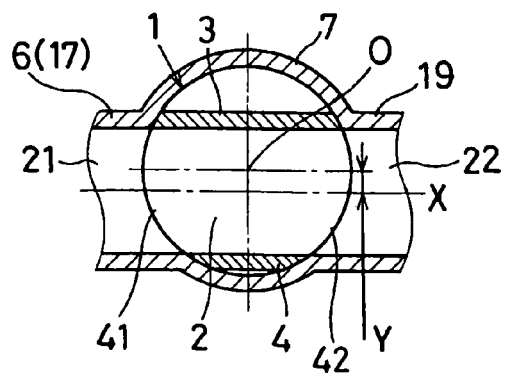
FIG. 9E is a cross-sectional view showing a fully-open opening degree state of the rotary valve according to the seventh embodiment.
Figure 12A:
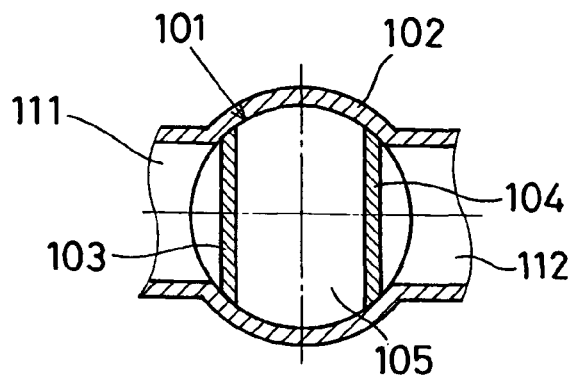
FIG. 12A is a cross-sectional view showing a fully-closed opening degree state of a rotary valve of a related art.
Figure 12B:
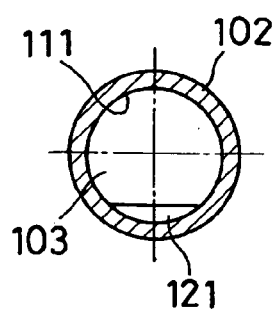
FIGS. 12B to 12D are cross-sectional views each showing a small opening degree state of the rotary valve of the related art.
Figure 12C:
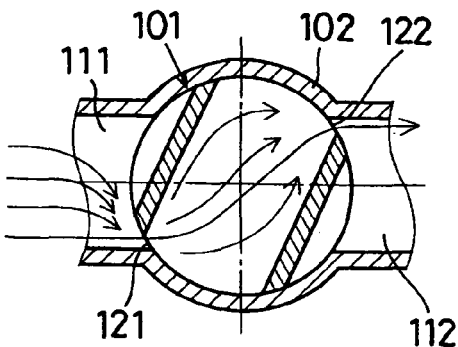
Figure 12D:
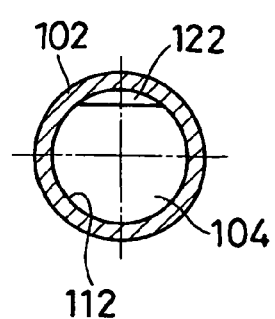
Figure 12E:
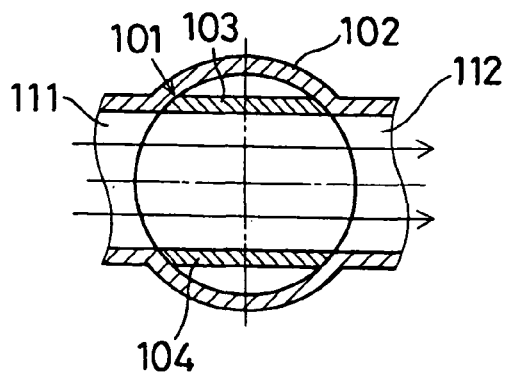
FIG. 12E is a cross-sectional view showing a fully-open opening degree state of the rotary valve of the related art.

Next, a seventh embodiment of the present invention will be described with reference to FIGS. 9A to 9E. FIG. 9A is a diagram showing a state of the fully-closed opening degree where the rotary valve 1 is fully closed. FIGS. 9B to 9D are diagrams each showing a state of the small opening degree where the rotary valve 1 is open. FIG. 9E is a diagram showing a state of the fully-open opening degree where the rotary valve 1 is fully open.

In the intake vortex flow generating device according to the present embodiment, as shown in FIGS. 9A to 9E, the size of the second valve main body 4 of the rotary valve 1 in the plate length direction (i.e., the plate length of the second valve main body 4) perpendicular to the plate thickness direction thereof is set shorter than the size of the first valve main body 3 of the rotary valve 1 in the plate length direction (i.e., the plate length of the first valve main body 3) perpendicular to the plate thickness direction thereof.

In the intake vortex flow generating device according to the present embodiment, as shown in FIG. 9A, the second valve main body 4 has the formation position of the central portion closer to the outer peripheral portion of the circular housing 5 than the formation position of the central portion of the first valve main body 3 is, for example, when the rotary valve 1 is fully closed.

Further, in the intake vortex flow generating device according to the present embodiment, the rotational axis line (the rotational center O) of the first and second valve main bodies 3, 4 is offset from the central axis line X of the first and second intake passages 21, 22 to the second intake throttle portion side (i.e., to the upper side of the first and second intake passages 21, 22 in the direction of the gravitational force: to the upper side in the figure) by a predetermined offset amount Y. In consequence, as shown in FIGS. 9B to 9D, the opening area of the second intake throttle portion 12 can be made larger than that of the first intake throttle portion 11 even when the opening area of the first intake throttle portion 11 is narrow and the intake air quantity supplied into the combustion chamber in each cylinder of the engine is relatively small as in the case where the engine is in the low rotation speed region or the low load region. Accordingly, also the intake vortex flow generating device according to the present embodiment can exert an effect similar to that of the first embodiment.

Next, an eighth embodiment of the present invention will be described with reference to FIGS. 10A to 10E. FIG. 10A is a diagram showing a state of the fully-closed opening degree where the rotary valve 1 is fully closed. FIGS. 10B to 10D are diagrams each showing a state of the small opening degree where the rotary valve 1 is open. FIG. 10E is a diagram showing a state of the fully-open opening degree where the rotary valve 1 is fully open.

The intake passage to the engine according to the present embodiment includes the first intake passage 21 (i.e., the intake passage inside the first pipe portion 17) formed upstream of the upstream side opening portion (i.e., the inlet portion) of the valve accommodation chamber 10 of the cylindrical portion 7 of the intake manifold 6 and the first valve main body 3 of the rotary valve 1 with respect to the intake flow direction. The intake passage also includes the second intake passage 22 (i.e., the intake passage inside the second pipe portion 19) formed downstream of the opening portion (i.e., the outlet portion) of the valve accommodation chamber 10 of the cylindrical portion 7 of the intake manifold 6 and the second valve main body 4 of the rotary valve 1 with respect to the intake flow direction.

In the intake vortex flow generating device according to the present embodiment, as shown in FIGS. 10A to 10E, the central axis line X2 of the second intake passage 22 is offset from the central axis line X1 of the first intake passage 21 to the second intake throttle portion side (i.e., to the upper side of the first and second intake passages 21, 22 in the direction of the gravitational force: to the upper side in the figure) by a predetermined offset amount Y. In consequence, as shown in FIGS. 10B to 10D, the opening area of the second intake throttle portion 12 can be made larger than that of the first intake throttle portion 11 even when the opening area of the first intake throttle portion 11 is narrow and the intake air quantity supplied into the combustion chamber in each cylinder of the engine is relatively small as in the case where the engine is in the low rotation speed region or the low load region. Accordingly, also the intake vortex flow generating device according to the present embodiment can exert an effect similar to that of the first embodiment.

Next, a ninth embodiment of the present invention will be described with reference to FIGS. 11A to 11F. FIG. 11A is a diagram showing a state of the fully-closed opening degree where the rotary valve 1 is fully closed. FIGS. 11B to 11E are diagrams each showing a state of the small opening degree where the rotary valve 1 is open. FIG. 11F is a diagram showing a state of the fully-open opening degree where the rotary valve 1 is fully open.

In the intake vortex flow generating device according to the present embodiment, a notch portion 61 is formed in the lower end face (in the figure) of the first valve main body 3 of the one rotary valve 1. Thus, the first intake throttle portion 11 is formed between the notch portion 61 of the first valve main body 3 and the cylindrical portion 7 of the intake manifold 6 when the rotary valve 1 rotates around the rotational axis line thereof and the first valve main body 3 is held at the state of the small opening degree in the low rotation speed region or the low load region of the engine.

Further, in the intake vortex flow generating device according to the present embodiment, as shown in FIGS. 11C and 11D, the second intake throttle portion 12 is formed between the upper end portion (in the figure) of the second valve main body 4 and the cylindrical portion 7 of the intake manifold 6 when the rotary valve 1 rotates around the rotational axis line thereof and the second valve main body 4 is held at the state of the small opening degree in the low rotation speed region or the low load region of the engine.

In the intake vortex flow generating device, two notch portions 62 and one projection 63 are formed on the upper end face (in the figure) of the second valve main body 4 of the single rotary valve 1. Thus, as shown in FIGS. 11C and 11E, the second intake throttle portion 12 is formed between the two notch portions 62 and the one projection 63 of the second valve main body 4 and the cylindrical portion 7 of the intake manifold 6 when the rotary valve 1 rotates around the rotational axis line thereof and the second valve main body 4 is held at the state of the small opening degree in the low rotation speed region or the low load region of the engine.

In the intake vortex flow generating device according to the present embodiment, as shown in FIGS. 11A to 11F, the notch portions 61, 62 and the projection 63 are formed in the first valve main body 3 and the second valve main body 4 so that the opening area of the second intake throttle portion 12 is larger than that of the first intake throttle portion 11 in the low rotation speed region or the low load region of the engine. In consequence, as shown in FIGS. 11B to 11E, the opening area of the second intake throttle portion 12 can be made larger than that of the first intake throttle portion 11 even when the opening area of the first intake throttle portion 11 is narrow and the intake air quantity supplied into the combustion chamber in each cylinder of the engine is relatively small as in the case where the engine is in the low rotation speed region or the low load region. Accordingly, also the intake vortex flow generating device according to the present embodiment can exert an effect similar to that of the first embodiment.

In the above embodiments, the intake vortex flow generating device is constructed to be able to generate the intake vortex flow (the tumble flow) in the longitudinal direction for promoting the combustion of the mixture gas in the combustion chamber in each cylinder of the engine. Alternatively, the intake vortex flow generating device may be constructed to be able to generate an intake vortex flow (a swirl flow) in the lateral direction for promoting the combustion of the mixture gas in the combustion chamber in each cylinder of the engine. In addition, the intake vortex flow generating device may be constructed to be able to generate a squish vortex for promoting the combustion in the engine.

The rotary valve 1 may be incorporated in the other intake tube than the intake manifold 6 or in the intake port 23 of the cylinder head 8 of the engine.

In the above embodiments, the valve drive device (i.e., the actuator) for driving the rotary shaft of the rotary valve 1 in the valve-opening direction or the valve-closing direction is constructed of the electric actuator having the electric motor and the power transmission mechanism. Alternatively, the actuator for driving the shaft of the intake control valve in the valve-opening direction or the valve-closing direction may be constructed of a negative pressure activated actuator having an electromagnetic or electric negative pressure control valve or an electromagnetic actuator having an electromagnet such as a coil and a moving core (or an armature).

The valve biasing component such as a spring for biasing the rotary shaft of the rotary valve 1 in the valve-opening operation direction or the valve-closing operation direction (e.g., a return spring for biasing the rotary shaft of the rotary valve 1 in the valve-opening operation direction (or the valve-closing operation direction) or a default spring for biasing the rotary shaft of the rotary valve 1 in the valve-closing operation direction (or the valve-opening operation direction) may not be installed.

In the above embodiments, the intake vortex flow (the tumble flow or the swirl flow) is generated in the combustion chamber of the engine when the engine is in the low rotation speed region or the low load region (for example, at the engine start-up, the engine idling operation or the low speed and low load operation of the engine). Alternatively, the intake vortex flow (the tumble flow or the swirl flow) may be generated in the combustion chamber of the engine when the engine rotation speed or the engine load is equal to or less than a threshold value during the other period than the period when the engine is in the low rotation speed region or the low load region (for example, when the engine is in an intermediate rotation speed region or an intermediate load region or when the engine is in a high rotation speed region or a high load region).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An intake device for an internal combustion engine comprising:
   (a) a duct forming an intake passage for supplying an intake air into a combustion chamber of the internal combustion engine;
   (b) a first valve main body rotatably provided in the intake passage such that the first valve main body can rotate relative to the duct;
   (c) a second valve main body rotatably provided in the intake passage such that the second valve main body can rotate relative to the duct and moves in conjunction with the first valve main body;
   (d) a first throttle portion formed between the duct and the first valve main body; and
   (e) a second throttle portion formed between the duct and the second valve main body or formed in the second valve main body, wherein
   the second valve main body is located downstream of the first valve main body with respect to a flow direction of the intake air when the intake device fully closes the intake passage or when rotation speed or a load of the internal combustion engine is equal to or less than a threshold value,
   the second valve main body has a plate length shorter than a plate length of the first valve main body, and
   an opening area of the second throttle portion is set larger than an opening area of the first throttle portion when the rotation speed or the load of the internal combustion engine is equal to or less than the threshold value.

2. The intake device as in claim 1, wherein
   the threshold value is an upper limit value of the rotation speed or the load of the internal combustion engine for obtaining an effect of improvement of a fuel consumption and an effect of early activation of a catalyst through generation of an intake vortex flow in the combustion chamber of the internal combustion engine.

3. The intake device as in claim 1, wherein the first valve main body and the second valve main body are located in series in the intake passage.

4. The intake device as in claim 1, wherein
the first valve main body or the first throttle portion has a function to vary a flow rate of the intake air supplied into the combustion chamber of the internal combustion engine, and
the second valve main body or the second throttle portion has a function to generate an intake fluidity or an intake vortex flow in the combustion chamber of the internal combustion engine.

5. The intake device as in claim 1, wherein
the rotation speed or the load of the internal combustion engine becomes equal to or less than the threshold value when the internal combustion engine is started, when idling operation of the internal combustion engine is performed, or when the internal combustion engine is operated at low speed and a low load.

6. The intake device as in claim 1, wherein
the first valve main body and the second valve main body are held at a state of an intermediate opening degree, to which the first valve main body and the second valve main body have been opened in a valve-opening operation direction from a fully closed position, when the rotation speed or the load of the internal combustion engine is equal to or less than the threshold value, the fully closed position being a state of a fully-closed opening degree where the first valve main body and the second valve main body are fully closed.

7. The intake device as in claim 1, wherein
the first valve main body and the second valve main body are held at a state of an intermediate opening degree, to which the first valve main body and the second valve main body have been rotated in a valve-closing operation direction from a fully closed position, when the rotation speed or the load of the internal combustion engine is equal to or less than the threshold value, the fully closed position being a state of a fully-closed opening degree where the first valve main body and the second valve main body are fully closed.

8. The intake device as in claim 1, wherein
the first valve main body and the second valve main body are mechanically connected with each other through a circular housing, and
the second valve main body has a formation position of a central portion closer to an outer peripheral portion of the housing than a formation position of a central portion of the first valve main body is.

9. The intake device as in claim 1, wherein
the second valve main body has a larger inclination angle with respect to a vertical line of a rotational axis line of the second valve main body than an inclination angle of the first valve main body with respect to a vertical line of a rotational axis line of the first valve main body.

10. The intake device as in claim 1, wherein
the rotational axis line of the first valve main body and the rotational axis line of the second valve main body are offset to the second throttle portion side from a central axis line of the intake passage.

11. The intake device as in claim 1, further comprising:
a single actuator for collectively varying rotational angles of the first valve main body and the second valve main body.

12. The intake device as in claim 1, wherein
the first valve main body is mechanically connected to the second valve main body.

* * * * *